Jan. 12, 1932.  D. H. DAVIS  1,840,435
TRAILER REACH
Filed March 17, 1930
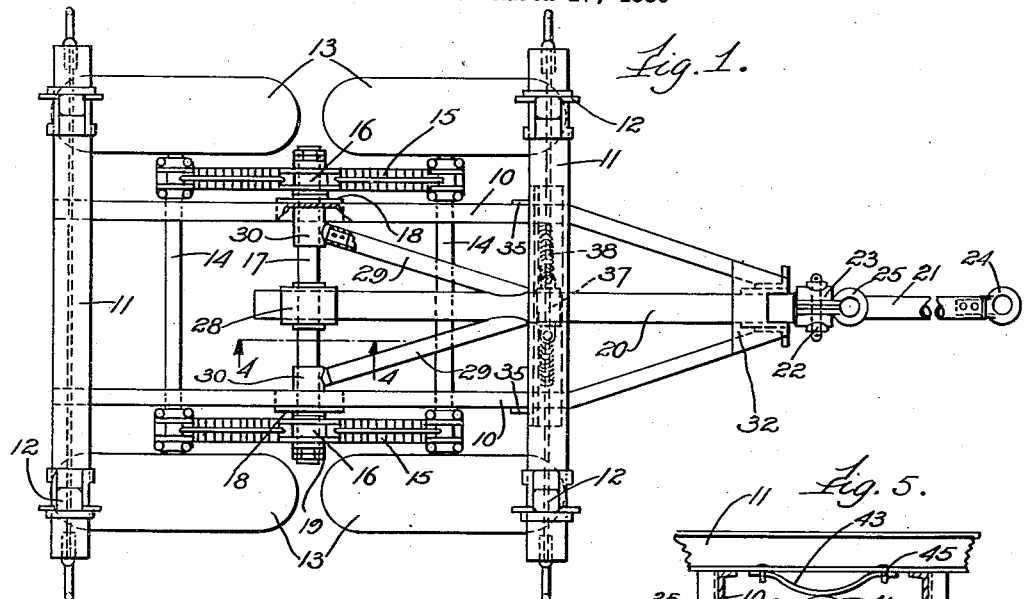
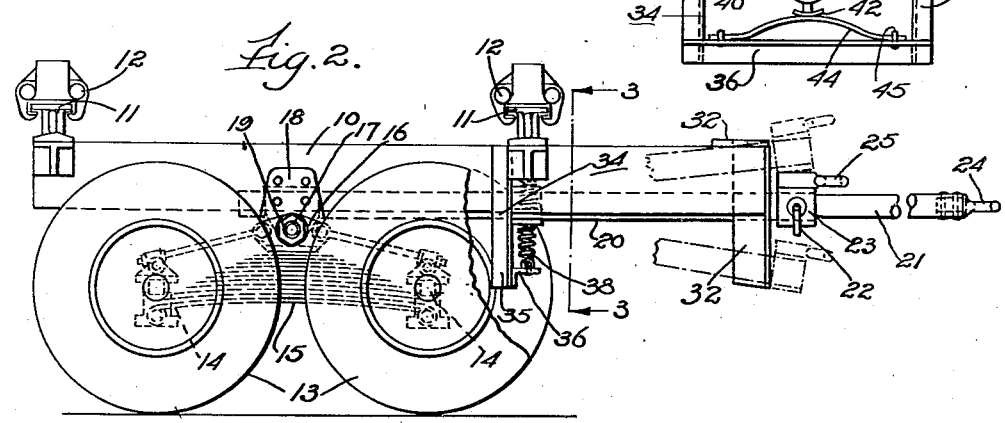
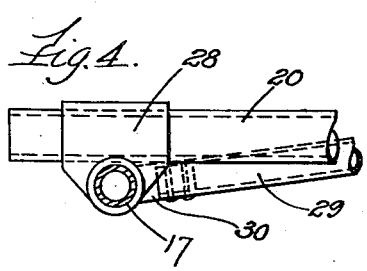
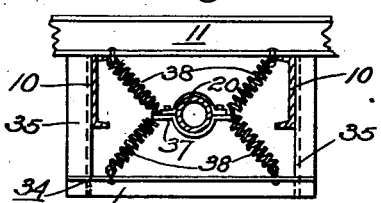
Inventor.
Durrel H Davis.
by his Attorneys.
Witness
N. T. McKnight.

Patented Jan. 12, 1932

1,840,435

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

TRAILER REACH

Application filed March 17, 1930. Serial No. 436,315.

This invention relates to trailer vehicles, and more particularly to vehicles of the type adapted for hauling or assisting in hauling relatively long objects such as poles, pipes, etc., wherein the trailer is frequently disposed at a substantial distance to the rear of the draft vehicle. One of the objects of the present invention resides in the provision of an improved vehicle of this character which is simple in construction, compact and durable, and which provides substantial road engaging surface for distributing the load carried by the trailer over a relatively large area of the road bed. Another object is to provide in a vehicle of this type an improved reach construction which is incorporated as a part of the vehicle draw bar. A further object resides in the provision of means normally tending to yieldingly maintain the draw bar in a definite relation with respect to the vehicle frame and arranged for cushioning the shocks and vibration between the draw bar and said vehicle frame. It consists in certain features and elements of construction herein shown and described, as indicated by the claims.

In the drawings:

Figure 1 is a top plan view of a trailer vehicle embodying the present invention.

Figure 2 is a side elevation.

Figure 3 is a transverse vertical section taken substantially as indicated at line 3—3 on Figure 2.

Figure 4 is an enlarged fragmentary sectional view taken at line 4—4 on Figure 1.

Figure 5 is a view similar to Figure 3 showing a modified construction.

The vehicle embodying the present invention includes a main frame composed of two transversely spaced longitudinally extending channel members, 10, the forward ends of which converge and are secured together in any suitable manner. Disposed on the top of said channel members are a pair of longitudinally spaced transversely extending load supporting beams, 11, which serve as bolsters, on which are carried the usual chock blocks, 12. The frame is supported by two pairs of longitudinally spaced supporting wheels, 13, the pairs of which are connected together by transverse axles, 14, and said axles are connected together adjacent the inner faces of said wheels by longitudinally extending leaf springs, 15. Rigidly connected to the middle of said springs at the upper sides thereof are brackets, 16, which are journaled on a transverse horizontally extending rock shaft, 17, supported in brackets, 18, carried on the side members, 10, of the frame. By reason of this construction the two pairs of supporting wheels are permitted to rock as a unit about the horizontal axis of the shaft, 17, for accommodating the road irregularities, while at the same time distributing the load on said frame over a relatively large area of the road bed. The rock shaft which is herein shown as of tubular form, may be either fixed or journaled in the bracket, 18, with the lock nuts, 19, on the outer ends of said shaft acting as collars, for preventing axial shifting of the parts.

Extending longitudinally of the frame is a draw bar which embodies a reach structure and includes a main hollow tubular section, 20, in which is adapted to be telescoped a smaller tubular section, 21, and secured in place with respect to said main section, 20, by the lock pin, 22, carried in a coupling bracket, 23, secured to the forward end of the main section, 20. The forward end of the smaller section, 21, is provided with the usual coupling eye, 24, for securement to any suitable draft connection such as a pintle hook on the tractor vehicle to which it is connected. The bracket, 23, has an integrally formed coupling eye, 25, which is used when it is desired to have a relatively short draw bar length, at which time the smaller section, 21, is removed entirely or telescoped into the main section, 20, in reversed position. The main draw bar section, 20, is formed as a reach and its rear end extends through a bearing bracket, 28, carried loosely on the rock shaft, 17, in approximately central relation of the vehicle; and rigidly secured to said main tubular section, 20, at about the middle of its length are a pair of rearwardly diverging tubular draft members, 29, the ends of which are rigidly secured to bearing brackets, 30, journaled on said rock shaft adjacent the inside of the channel members, 10, of the main frame. By reason of this construction the draw bar may be swung in vertical direction about the same axis about which the wheeled load supporting unit is adapted to be swivelled. The forward converging ends of the channel side members of the frame have secured thereto a depending yoke, 32, encasing the main section, 20, of the draw bar, and arranged for limiting the extent of angular swing of said draw bar with respect to the main frame in a vertical direction.

To avoid transmission of shocks and vibration between the frame and draw bar, and to steady the frame when running without load, I provide means of a yieldable nature for cushioning the impact of such shocks and to absorb vibration. Supported substantially below the front bolster beam, 11, is a structural frame, 34, including a pair of vertically disposed members, 35, secured to the backs of the channels, 10, and connected at their lower ends by a transverse member, 36, located approximately the same distance below the draw bar, 20, as the normal distance between the draw bar and the bolster beam, 11. Mounted on the main draw bar section, 20, is a clamp, 37, and substantially in the plane of the structural frame, 34, to which are secured the ends of two pairs of obliquely disposed coil springs, 38, whose other ends are connected to the bolster beam, 11, and the transverse member, 36, in a manner tending to yieldingly maintain said draw bar in a definite and substantially parallel relation to the main frame. It will be seen that these coil springs are arranged so that any vertical movement of the draw bar with respect to the main frame is constantly opposed by one or the other pairs of these springs, so that they act as a check or snubber for cushioning any sudden vibration or shock of the draw bar or the vehicle frame. This arrangement of springs is particularly advantageous in that said springs are wholly disposed out of the normal path of vertical swing of the draw bar, and the elongation of the springs for accommodating the full range of movement of the draw bar is relatively small.

Figure 5 illustrates a modified construction for yieldingly maintaining the draw bar in proper relation to the vehicle frame. In this construction, the clamp element, 40, which is secured to the main tubular draw bar section, 20, is provided at top and bottom with offset shoes, 41 and 42, which normally are engaged between transversely disposed flat springs, 43 and 44, respectively. These springs are loosely secured by U-shaped shackle members, 45, to the under side of said bolster beam, 11, and to the transverse member, 36, of the depending frame, 34. Thus any vertical movement of the main draw bar section in either upward or downward direction is opposed by one or the other of these flat springs, and it will be apparent that if the draw bar is moved to either one or the other of its limits the flat spring that is engaged will be compressed and somewhat straightened, the elongation thereof being accommodated by the loose connection with the U-shackles, 45.

I claim:

1. In a trailer vehicle of the class described, the combination of a frame, two pair of longitudinally spaced supporting wheels, means connecting the corresponding wheels of the respective pairs, a transversely disposed horizontally extending rock shaft pivotally connecting said means and frame, and a draw bar mounted at its rear end on the rock shaft for swinging about the axis of said shaft.

2. In a trailer vehicle of the class described, the combination of a frame, two pairs of longitudinally spaced supporting wheels, a horizontal transversely extending rock shaft carried on the frame intermediate the wheels, longitudinally extending transversely spaced leaf springs connecting corresponding wheels of the respective pairs, said springs being attached adjacent the middle to the rock shaft, and a draw bar having a pair of diverging draft members at its rear end connected to said rock shaft adjacent the springs and arranged to permit swinging of said draw bar vertically about the axis of the shaft.

3. In a trailer vehicle of the class described the combination of a frame, two pair of longitudinally spaced supporting wheels, a transverse horizontally disposed rock shaft carried by the frame, means connecting corresponding wheels of the respective pairs and mounted on said shaft for swivelling about the axis thereof, a draw bar connected at its rear end to the rock shaft, and means carried on the frame and engageable with the draw bar and normally tending to yieldingly support the latter in substantially parallel horizontal relation to the frame.

4. In a trailer vehicle of the class described, the combination of a frame normally disposed in approximately horizontal position, two pairs of longitudinally spaced supporting wheels, a horizontal, transversely extending rock shaft carried by the frame intermediate said pairs of wheels, means connecting corresponding wheels of the respective pairs, said means being mounted on the rock shaft for permitting oscillation of said wheels about the axis of the shaft, a longitudinally extending drawbar having its rear end attached to the shaft and arranged for swinging about the axis thereof, and two sets of spring means carried by the frame and arranged for working in opposition to each other and engageable with the draw bar, normally tending to yieldingly oppose vertical movement of said draw bar and supporting it in proper draft relation to the frame.

5. In a trailer vehicle, a frame, supporting wheels and axle therefor, spring means connecting the wheels to the frame and arranged to permit the latter to rock in fore-and-aft direction about a transverse horizontal axis, a longitudinally extending drawbar associated with the vehicle and having its rear end connected for swinging about said transverse axis, and two sets of spring means carried by the frame adjacent the forward end arranged for working in opposition to each other for yieldingly opposing the vertical movement of the drawbar and tending to support the same in proper draft relation to the frame.

6. In the construction defined in claim 5, guide means carried on the frame forwardly of the spring means arranged for permitting a limited range of angular swing of the draw bar in vertical direction above and below the normally assumed position of said draw bar.

7. In the construction defined in claim 5, said spring means each including a pair of obliquely disposed coil springs arranged in laterally off-set relation to the path of travel of the draw bar.

8. In the construction defined in claim 5, said spring means consisting of transversely disposed flat springs arranged above and below said draw bar and normally in contact therewith.

In testimony whereof, I have hereunto set my hand at Edgerton, Wis., this 12th day of March, A. D. 1930.

DURREL H. DAVIS.